(12) United States Patent
Eddy et al.

(10) Patent No.: US 7,009,996 B1
(45) Date of Patent: Mar. 7, 2006

(54) METHOD AND SYSTEM FOR TRANSMITTING PERIODIC AND APERIODIC DATA OVER A CRITICAL AVIONICS DATABUS

(75) Inventors: Brett Allen Eddy, Phoenix, AZ (US); Kenneth Paul Hoyme, Plymouth, MN (US); Byron F. Birkedahl, Glendale, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/315,399

(22) Filed: May 20, 1999

(51) Int. Cl.
*H04L 12/66* (2006.01)
(52) U.S. Cl. .................... 370/463; 370/462
(58) Field of Classification Search ............... 370/362, 370/363, 364, 365, 451, 452, 447, 458, 461, 370/462, 463, 468, 467, 395.4, 395.41, 455
See application file for complete search history.

(56) References Cited

U.S. PATENT DOCUMENTS

| | | | |
|---|---|---|---|
| 5,809,021 A | * | 9/1998 | Diaz et al. .................... 370/364 |
| 5,954,810 A | * | 9/1999 | Toillon et al. ............... 710/129 |
| 6,003,146 A | * | 12/1999 | Beutler ........................ 714/701 |
| 6,133,846 A | * | 10/2000 | Birkedahl et al. ........... 340/825 |

FOREIGN PATENT DOCUMENTS

| | | |
|---|---|---|
| DE | 197 25 422 A1 | 6/1997 |
| JP | 0 837 579 A2 | 10/1997 |
| WO | WO 98/45966 | 10/1998 |

OTHER PUBLICATIONS

"*Fire on the Wire: The IEEE 1394 High Performance Serial Bus*", Jan. 15, 1997, *1394 Architecture*, pp. 1-7.

* cited by examiner

*Primary Examiner*—Duc Ho
*Assistant Examiner*—Thien D. Tran
(74) *Attorney, Agent, or Firm*—Andrew A. Abeyta

(57) ABSTRACT

A network architecture (100) that supports periodic and aperiodic data transmissions over a network databus. The network (100) comprising a plurality of Network Interface Controller (NIC) modules (120, 169) configured to communicate with each other with at least one of the modules acting as a master NIC modules (120) and configured to allocate data transmission bandwidth on the network databus (114) using a set of priority sequences stored in a table (158) accessible by the master NIC (154) within the master timing NIC module (120). The table (158) is used by the master NIC (120) to allocate bandwidth on the network databus (114) after transmission of periodic data and according to priority, length and frame sequence. In this way, aperiodic data from some NIC modules is guaranteed a certain amount of bandwidth on the network databus (114).

13 Claims, 3 Drawing Sheets

METHOD AND SYSTEM FOR TRANSMITTING PERIODIC AND APERIODIC DATA OVER A CRITICAL AVIONICS DATABUS

TECHNICAL FIELD

The invention relates generally to data communications and more specifically to a communications protocol that permits the transfer of periodic and aperiodic data over an avionics databus using a priority scheme that provisions guaranteed bandwidth to periodic data transfers first with subsequent partitioning of available bandwidth to aperiodic data transfers based on priority and availability of bandwidth.

BACKGROUND OF THE INVENTION

A modern aircraft can include a large array of onboard computers including flight, navigation and communications systems among others. Often, such systems are networked together to permit integration of all subsystems on the aircraft. A communications databus is often used to provide the channel or signal pathway for the various systems of the aircraft.

As aircraft continue to become more complex, the need to ensure reliable and timely delivery of critical data to the flight crew creates design challenges and an emerging need for classifying flight data according to priority and data type. Often, multiple systems may be attempting to communicate over the same databus at the same time. Bandwidth, however, is limited and sharing of the communications topology by all systems on the aircraft is necessary, Accordingly, data transmissions on the bus are often relayed from one system to another according to timing and availability of bandwidth on the communications databus.

Over the years, various data formats that describe the timing and sequence of different types of data have evolved. These include periodic or deterministic data which is communicated according to predetermined timing sequences and cycles and aperiodic data, such as isochronous and asynchronous data. At the same time, data transmission protocols that standardize and dictate how such data formats are communicated between systems in an aircraft are available. Such protocols include the ARINC 629 standard and ASCB versions A–C.

With the ARINC 629 standard, data transmissions alternate between periodic and aperiodic data intervals. Terminals have one periodic transmission per frame, and may get one aperiodic transmission if time is remaining after the periodic transmission. Another prior art protocol includes ControlNet, a protocol for industrial automation where periodic data is sent first, then aperiodic data is sent using a token-passing mechanism.

A limitation of prior art protocols is that some require negotiation between the transmitter and receiver systems to ensure that data arrives at its intended destination point. Such negotiation sessions consume valuable bandwidth on the communications databus and add latency to the overall system. In addition bandwidth can depend on the number of systems accessing the databus so that a particular file may not receive the bandwidth necessary to reach its intended destination. In some circumstances, the system receives no guarantee of any bandwidth no assurances that a file was actually received. This is unacceptable in an avionics environment where data can be critical and receipt by flight crew personnel must be assured with guaranteed bandwidth assigned to critical data for safe and reliable operation of the aircraft.

In particular, various modules in an aircraft compete with one another for transmission time on the communications databus. The databus provides the signaling pathways along which periodic and aperiodic data is transmitted from one system to another on the aircraft. A problem with existing databus transmission protocols is that the systems are not able to adequately allocate bandwidth for transmission of the most important aperiodic data from aircraft systems or modules. The result is that transmission of data between modules fails, is delayed, or is transmitted inefficiently, with low-priority data being sent before high-priority data.

What is needed is a communications protocol for use in an avionics environment where available bandwidth is partitioned according to priority and whether the data transmission is periodic or aperiodic. A method and system of prioritizing aperiodic data transmission requests from the various systems in the aircraft, and transmit the aperiodic data based on the order determined by the prioritization scheme would provide numerous advantages over the prior art.

SUMMARY OF THE INVENTION

The present invention is an ASCB version D protocol for transmission of periodic, isochronous and asynchronous data for a avionics databus. The present invention meets the increased technological demands of modern avionics systems by prioritizing aperiodic data of modules according to a predetermined priority. Furthermore, the present invention guarantees bandwidth for critical aperiodic data transmissions.

According to one embodiment, disclosed is a network architecture that supports periodic and aperiodic data transmissions. The network architecture comprises a plurality of Network Interface Controller (NIC) modules interconnected to each other through a network bus with one of the NIC modules acting as a master NIC. A table stores priorities which are used by the master NIC to allocate bandwidth on the network bus. The table contains the transmission sequences used by the master NIC to allocate bandwidth on the databus based on priority, length, frame sequence and availability of bandwidth after transmission of periodic data.

The network databus can be arranged as a single or dual bus structure and arranged parallel to the NIC modules in the network architecture. A dual bus structure may be used if fail-operational capability is required. Each NIC module in the network transmits a request to transmit aperiodic data to the master NIC during a first time interval. The master NIC, in turn, receives all of the requests for aperiodic data transmission and determines based on the table which requests receive guaranteed bandwidth and which requests receive best effort bandwidth. In one embodiment, the table contents are non-volatile entries which describe which systems are guaranteed a particular amount of bandwidth for a particular frame on the network bus. The master NIC is capable of recognizing active frames and identifying the source of the data and the amount of bandwidth requested by a particular module.

After assigning available bandwidth for aperiodic transmissions to the requests, the master NIC creates and transmits a message that it transmitted to all NICs in the network during a second time interval. Each NIC receives and reads the message and compares what was requested with what was authorized for transmission. Thereafter, transmissions occur according to the bandwidth and order of transmission sequences authorized by the master NIC.

The sum of the guaranteed bandwidths for devices in the table are never more than a predetermined time interval. This ensures that guaranteed bandwidth for periodic data transfers is available. If a device in this scenario requests more bandwidth than is available, then excess data will be transmitted during the next available time frame.

Also disclosed is a method of communicating over a network comprising a plurality of Network Interface Controllers (NICs) coupled to one another by a network databus with one of the NICs acting as a master NIC and a table or similar structure is used to store priorities for transmission of aperiodic data over a network databus. The method comprises the steps of transmitting a request for transfer of the aperiodic data from one or more of the NICs; receiving and processing the requests; and prioritizing the requests to determine an order of transmission of the aperiodic data.

The prioritizing step is performed in accordance with a set of priorities stored in the table. The method also comprises the steps of transmitting a message from the master NIC to all NICs informing all NICs on the network what requests have received bandwidth and in what order.

A technical advantage of the present invention is the provision of a dual bus architecture that provides fail-operational capability of the network. The protocol arbitrates control of both buses to allow simultaneous transmission of identical data on both buses with high priority frames given the first opportunity to transmit. If one bus fails, the remaining bus is still fully functional.

Another technical advantage of the present invention is that the number and size of frames is allocated dynamically allowing better utilization of the databus.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts in the detailed description unless otherwise indicated.

DETAILED DESCRIPTION OF PREFERRED EMBODIMENTS

Figure 1:
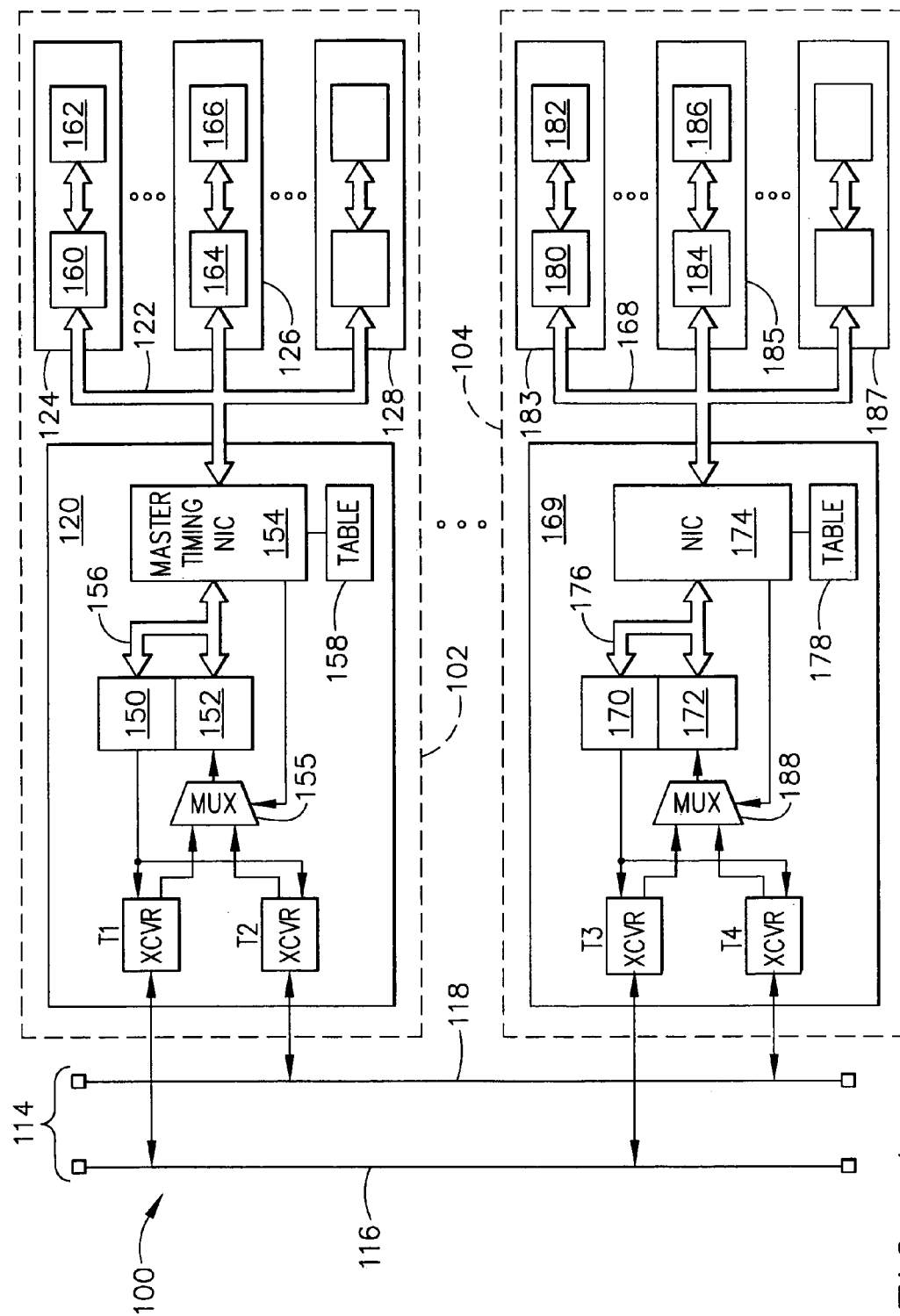
FIG. 1 is an architecture for an avionics network comprising a plurality of network interface control modules communicating with each other using a network databus.

With reference to FIG. 1, therein is shown the network architecture for an avionics network control system (the "network") denoted generally as 100. The network 100 comprises a network databus 114 arranged in a dual configuration and comprising a primary bus 116 and a secondary bus 118. The secondary bus 118 is optional but is particularly advantageous in an aircraft communications system, for example, where redundancy ensures uninterrupted transmission of data signals.

The network 100 includes a first device 102 with a master timing NIC module 120 coupled by a backplane bus 122 and to modules 124, 126, and 128. Device 102 may be a line replaceable unit (LRU) or a cabinet with line replaceable modules (LRMs). The modules 124, 126 and 128 represent subsystems of a typical avionics network 100. Thus, modules 124, 126 and 128 could, for example, represent the flight, navigation, and communications subsystems of the network 100. As shown, module 124 includes an interface 160 to the backplane bus 122 that couples an aircraft device 162 to the master NIC 154 within the NIC module 120. The device 162 may comprise one or more components of the aircraft configured to perform a flight related function. Examples of device 162 include microprocessors, sensors, gauges and other similar components used to implement the functionality of the specified subsystem.

Similarly, module 126 comprises an interface 164 to the backplane 122 that couples the device 166 to the NIC module 120. The NIC module 120 receives data from the devices 162 and 166 and communicates with the network databus 114 through a buffer 150 having transceivers T1 and T2 coupled thereto. The master timing NIC module 120 also comprises a receiver buffer 152 coupled to multiplexer (MUX) 155 and master NIC 154. The MUX 155 is coupled to transceivers T1 and T2 and is controlled by the master NIC 154.

Transceiver T1 is coupled to primary bus 116 of the network databus 114, and transceiver T2 is coupled to secondary bus 118 of the network databus 114. The transmission buffer 150 and the receiver buffer 152 are coupled to master NIC 154 by lines 156. The master NIC 154 is in communication with a table 158 which contains a predetermined priority scheme for transmission of aperiodic data signals throughout the network 100.

The second device 104 comprises a NIC module 169 coupled by a backplane bus 168 to modules 183, 185, and 187, for example. Module 183 comprises a backplane interface 180 coupled to device 182 while module 185 comprises a backplane interface 184 coupled to device 186, for example. The operation of devices 182 and 186 is similar to that described in connection with devices 162 and 166. The NIC module 169 comprises NIC 174 which is associated with a table 178 and transmit and receiver buffers 170, 172. The transmission buffer 170 is coupled to transceivers T3 and T4 which permit communications between the NIC module 169 and the network databus 114.

A MUX 188 is coupled to transceivers T3 and T4 and receive buffer 172 and is controlled by NIC 174. As with the master timing NIC module 120, transceivers T3 and T4 provide the transmit/receive capabilities for the NIC module 169 and the network databus 114.

Other aspects of the network are mirrored throughout the network architecture. For example, the NIC 174 has access to a corresponding table 178 that stores contents identical to table 158 associated with the master NIC 154. Typically, only the master NIC 154 accesses its table 158 to determine which aperiodic requests receive guaranteed bandwidth. However, according to one embodiment of the invention, the NIC 174 could use table 178 to pre-process and eliminate excessive bandwidth requests prior to placing the requests on network 114 for use by master NIC 154. All NICs 154, 174 in the network 100 are associated with a corresponding table 158, 178 or other similar structure. While FIG. 1 illustrates two NICS 154, 175, it should be understood that the this arrangement is only illustrative of the general topology for an avionics network system and that more or less NICS may be implemented in similar arrangement.

Figure 2:
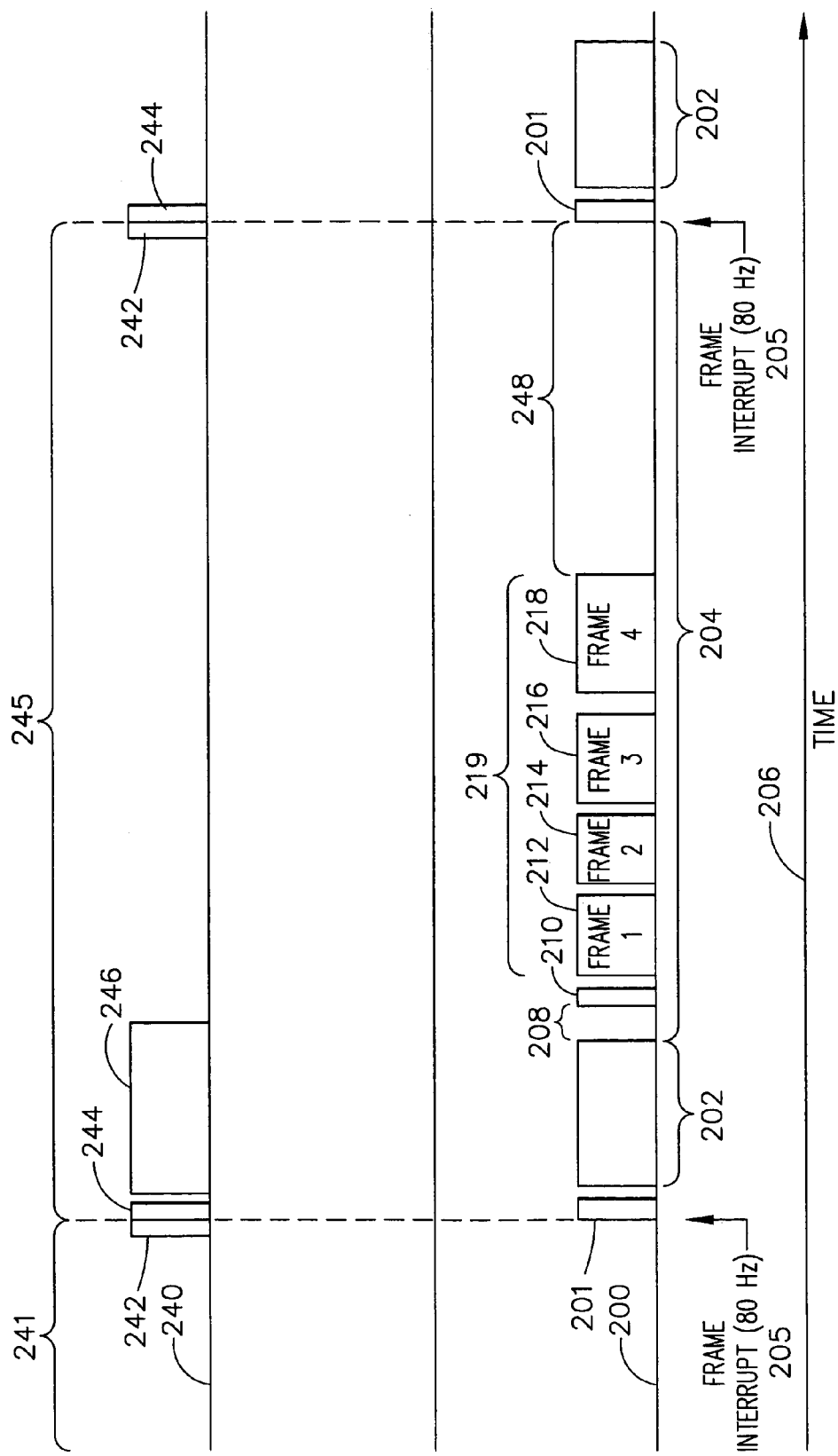
FIG. 2 shows a timing diagram for a communications protocol permitting transmission of periodic and aperiodic data in accordance with one embodiment of the present invention.

In the present invention, both periodic and aperiodic data may be transmitted throughout the network 100. FIG. 2 illustrates a timing diagram for accomplishing data transmissions that permits practical implementation of a protocol according to the invention. Signal 240 depicts a signal on backplane bus 168. Signal 200 represents a signal on network databus 114. As shown, signals 200 and 240 share the same time axis 206. One complete transmission cycle 245 of a signal 200 on the network databus 114 includes a synchronization interval 201, a periodic data interval 202, as well as an aperiodic data interval 204.

Periodic data is sent during time interval 202, which represents deterministic data transmitted at regular time intervals, always present on the network databus 114. Examples of periodic data in an aircraft network system include pitch attitude, air speed, altitude, and other data needed for filtering or rate limiting at precise intervals.

Aperiodic data is data sent at irregular basis over the network databus 114 during the time interval 204 which represent the bandwidth available on the network databus 114 for aperiodic transmissions, and which equals the transmission cycle 245 less the time interval 202 during which periodic data is sent and the synchronization period 201. Aperiodic data may be either asynchronous, isochronous, or both. Asynchronous data is data having a transmission timing unrelated to the timing of the periodic data. An example of asynchronous data may be a transfer of a data file, where transfer time is not critical. Isochronous data is data needing transmission periodically, but such data is not necessarily present all the time on the network databus 114. Examples of isochronous data include real time data such as audio or video. For example, modules 124, 126, 128, 181, 185, and 187 of FIG. 1 may need to communicate with one another or with NIC 174 or master NIC 154 which may be accomplished by aperiodic data transmissions.

Aperiodic data is preferably transmitted throughout the network 100 in the following manner (see the timing diagram of FIG. 2). During time interval 241, devices 162 or 182, for example, assemble the data to be transmitted and creates a request to transmit aperiodically. Essentially, the requesting devices are seeking bandwidth for transmission of aperiodic data on the network databus 114. Next, the requests are transmitted to the backplane interface 160 or 180 associated with the devices 162 or 182, respectively.

All such requests are created and assembled by the end of time period 241. During interval 242, the master NIC 154 and the NIC 174 pass data received by the NICs during interval 241 to the backplane interfaces 160, 168, 180, and 184 for use by the devices 162, 166, 182, and 186. During interval 244, the master NIC 154 and the NIC 174 retrieves the data and aperiodic transmission request from backplane interface 160 and 180. Such requests may be made with the master NIC 154 by devices 162 or 166, or with NIC 174 by devices 182 or 186, for example.

The discussion will continue describing an aperiodic data request by device 182. During interval 244, NIC 174 reads periodic data and requests for aperiodic data transmission created by device 182. In one embodiment, the intervals 242 and 244 last 237 microseconds or less, for example. Time interval 246 is allocated for periodic data transmission.

The master NIC 154 periodically initiates transmission of periodic data 1202 by activating a frame interrupt 205 (e.g. 80 Hz) to the modules. Frame interrupt 205 initiates a synchronization period where the NIC 174, master NIC 154 (and other NICs) in the network 100 are synchronized with one another to avoid congestion and timing interrupts. After a small gap of time, in frame 202, periodic data and requests for aperiodic data transmission are transmitted over the network databus 114. At the end of time interval 202, every NIC 174, including the master NIC 154, has finished sending their respective periodic data, and also their requests for aperiodic data.

During time interval 208, the master NIC 154 processes all of the requests for aperiodic data transmission and determines, based on the priorities stored in table 158, which requests receive guaranteed bandwidth and which requests receive best effort bandwidth. In one embodiment, the table 158 stores a set of non-volatile entries describing which devices are guaranteed a particular amount of bandwidth for a particular frame. The table 158 is capable of recognizing what active frame it is, and identifying the source of the data and the bandwidth the device is requesting. In one embodiment, table 158 is static and may contain, for example, data block size and type of data.

After dividing up the bandwidth on the network databus 114 available for aperiodic transmissions among the requests according to priority and available bandwidth during time interval 208, the master NIC 154 creates a message that is transmitted over the network databus 114 during time interval 210. Time interval 210 is a broadcast message informing the other NICs 174 what can be transmitted and when it can be transmitted. Each NIC 174 reads the broadcast message received during interval 210 and compares what was requested with what was authorized for transmission. In blocks 212 through 218, the devices transmit their aperiodic data in the order authorized by the master NIC 154.

The sum of the guaranteed bandwidths for devices in the table 158 will never be more than the time interval 204 less the time intervals 208 and 210. This is advantageous because if every device having a guaranteed bandwidth asks for its guaranteed bandwidth, the devices will all be able to transmit their aperiodic data. If a device in this scenario requests more bandwidth than its guarantee, then the excess data will be sent in the next available frame.

Another possibility is that either not all devices guaranteed bandwidth request their maximum bandwidth, or the sum of all guaranteed bandwidths is less than time interval 204. This scenario results in excess time 248 residing in time interval 204. During the excess time 248, aperiodic data from devices not having guaranteed bandwidth, or from devices requesting transmission of aperiodic data in excess of their guaranteed bandwidth may be transmitted. This decision is made by the master NIC 154 when referencing the table 158.

An identical periodic data signal 202 is transmitted simultaneously on both network buses 116 and 118 by NICs 154 and 174 in their time frames. This allows a NIC to switch from one bus to another with little or no loss of data, providing redundancy in the network 100. The time interval 202 for periodic transmissions may be, for example, approximately 2 msec.

The master NIC 154 receives requests for aperiodic data transmission not only from its own modules 124, 126, 128, but all other requests from other NIC's in the network 100. A module's request for aperiodic data transfer may comprise characteristics of the data transfer, for example, data source, data destination, desired transmission block size, required transition block, either single period or multiple period transmission, and priority based on type of data, for example, asynchronous or isochronous.

The prioritization information from the master NIC 154 is preferably transmitted on the network databus 114 and all backplane buses in the network 100. Data from modules can be transmitted the form of data "blocks." Preferably, the master NIC 154 assigns and transmits a priority, link, and sequence number for each block (for aperiodic data from modules) allocated for use by the NICs 174. The sequence number is a unique value for each transmission that eventually rolls over. The sequence number is embedded in each transmission for unique identification in case there is a need to retransmit a particular block.

The number of aperiodic frames available on the network databus 114 is a function of the time available for aperiodic data transfer 204 and the requested block sizes. The time required to transfer the allocated blocks for transmission may not exceed the time remaining before the next periodic data transfer. A multiple period request must be acknowledged in each frame, or acknowledgment will terminate connection.

Figure 3:
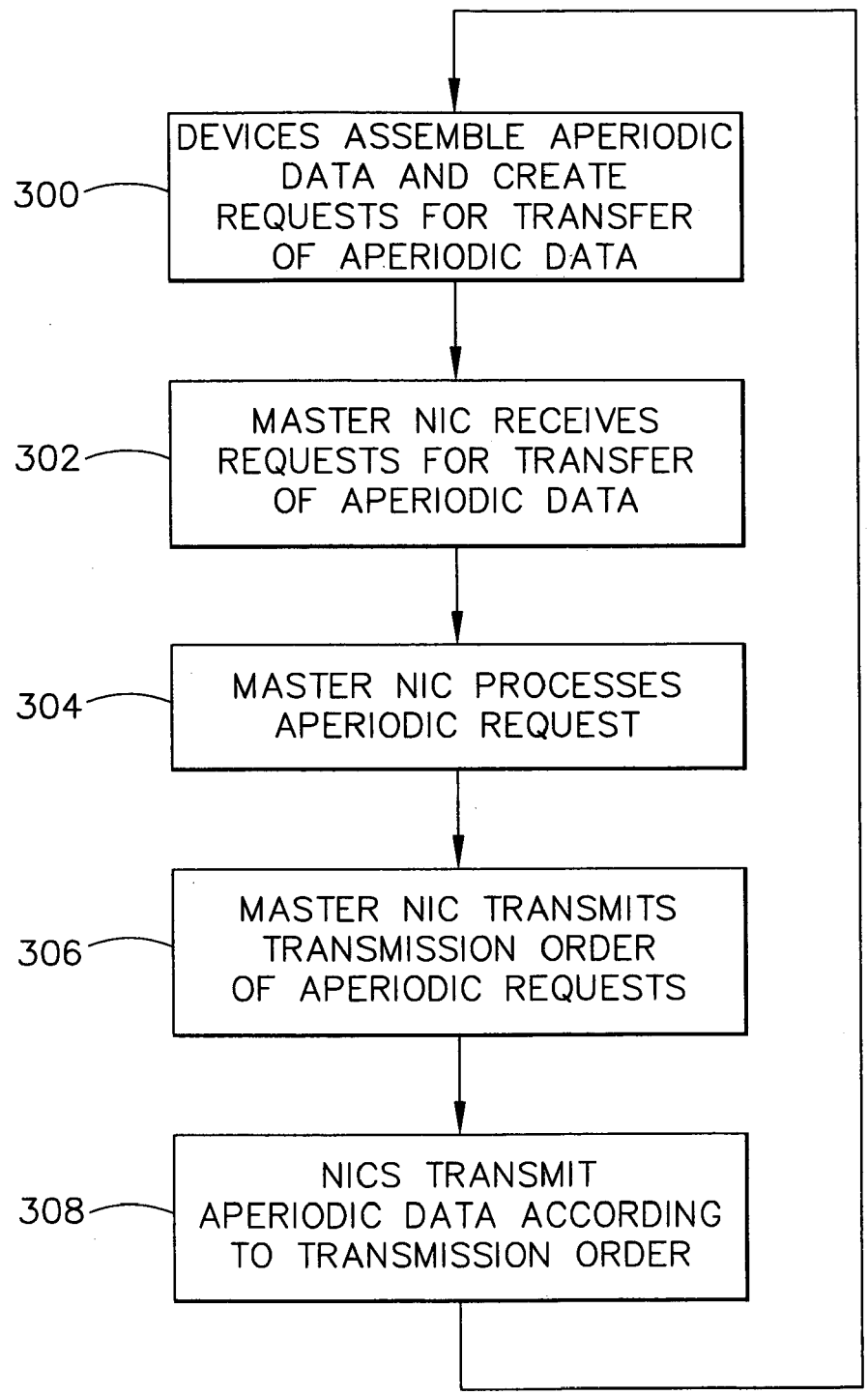
FIG. 3 is a process flow diagram illustrating the method of transmitting aperiodic data according to one embodiment of the invention.

A flow chart for a preferred embodiment of the present invention is shown in FIG. 3. In step 300, network devices, such as 162 or 182, assemble data to be transmitted aperiodically and create an aperiodic transmission request (time interval 241 of FIG. 2). In step 302, the master NIC 154 receives requests for transmission of aperiodic data from all modules (124, 126, 128, 181, 185, 187) during time interval 202 of FIG. 2. The master NIC 154 then processes the aperiodic requests (step 304; interval 208 of FIG. 2) and transmits a transmission order for aperiodic requests (step 306; interval 210 of FIG. 2). Next, the NICs transmit aperiodic data according to the transmission order specified by the master NIC 154 (step 308, interval 219 of FIG. 2).

Advantages of the present invention include providing a network with a prioritization scheme for transmission of aperiodic data. The ability to provide a guaranteed bandwidth for such transmission is also provided. Further advantages include the ability to give high priority frames the first opportunity to transmit aperiodic data, while lower priority frames are transmitted in any excess time, or subsequent frames.

The present protocol eliminates the possibility of overloading the network databus 114, causing undesirable transmission delays. Furthermore, the number and size of frames is allocated dynamically, allowing the best databus utilization for a given transmission scenario. Also, the present system is versatile, and may be used in various types of networks, including but not limited to aircraft systems and TCP/IP protocols and applications, for example, audio or video on the Internet.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A network architecture supporting periodic and aperiodic transmission of data comprising:
   a network databus; and
   a plurality of Network Interface Controller (NIC) modules capable of communicating over said network databus, at least one of said plurality of NIC modules acting as a master timing NIC module configured (i) to allocate a first time interval for transmission of periodic data over said databus, (ii) to dynamically allocate an aperiodic data transmission time interval, and (iii) to dynamically assign variable time slots within the aperiodic data transmssion time interval for transmission of aperiodic data on said network databus, said master timing NIC module including a means of determining what bandwidth is assigned to the aperiodic data transmissions based on priority, length and sequence of frames,
   wherein said master timing NIC module comprises:
      a master NIC configured to receive requests for aperiodic data transmissions from one or more of said plurality of network devices; and
      a priority table for storing a predetermined set of priorities assigned to requests for aperiodic data, said table accessible by said master NIC; and
      a transceiver means coupled to said master NIC and providing a signal pathway between said master NIC and said network databus.

2. The network architecture of claim 1 wherein said master NIC is configured to guarantee a certain amount of bandwidth for the transmission of aperiodic data.

3. The network architecture of claim 1 wherein said network bus comprises a dual bus structure.

4. The network architecture of claim 1 further comprising a plurality of network devices communicably coupled to said plurality of NIC modules.

5. The network architecture of claim 1 wherein said transceiver means comprises:
   a receive buffer for reading data from said network databus; and
   a transmit buffer for writing data on said network databus.

6. The network architecture of claim 1 wherein each of said plurality of NIC modules comprises:
   a NIC configured to receive requests for aperiodic data transmission from one or more of said plurality of network devices; and
   a table associated with said NIC for storing a predetermined set of priorities assigned to requests for aperiodic data, said table accessible by said master NIC; and
   a transceiver means coupled to said master NIC and providing a signal pathway between said master NIC and said network databus.

7. The network architecture of claim 6 wherein said master NIC is configured to transmit the contents of said priority table to each of said tables associated with each of said plurality of NIC.

8. A network for transmitting data between modules in a communications system, wherein said data comprises periodic data and aperiodic data, said network comprising;
   a master network interface controller, wherein said master interface controller is configured (i) to allocate a first time interval for transmission of periodic data over a network databus, (ii) to dynamically allocate an aperiodic data transmission time interval, and (iii) to dynamically assign variable time slots within the aperiodic data transmission time interval for transmission of aperiodic data on said network databus;
   a first backplane coupled to said master network interface controller, a plurality of first modules coupled to said first backplane, wherein data is transmittable from one of said first modules along said first backplane to another of said first modules and said master network interface controller;
   a network databus coupled to said master network interface controller;
   at least one network interface controller coupled to said network databus;
   a second backplane coupled to said network interface controller,
   a plurality of second modules coupled to said second backplane, wherein data is transmittable from one of said second modules along said second backplane to another of said second modules and said network interface controller; and wherein:

said first and second modules are capable of requesting transmission of said aperiodic data over said network databus, wherein said requests of transmission are dynamically prioritizable by said master network interface controller, said master network interface controller comprises a data transmission prioritization table, wherein said table comprises priority information regarding said aperiodic data, and said priority information comprises data block size and type of data, wherein said type of data comprises isochronous and asynchronous data.

9. The network of claim 8, wherein said aperiodic data comprises isochronous or asynchronous data.

10. The network of claim 8 wherein said aperiodic data is transmittable from a first module to another first module or a second module in the network.

11. The network of claim 8, wherein said aperiodic data from at least one of said first and second modules comprises a bandwidth, wherein said bandwidth is guaranteed transmission on said network.

12. A method of transmitting both periodic and aperiodic data in a network system comprising a network databus with a plurality of Network Interface Controller (NIC) modules arranged to communicate said data over said network databus, at least some of said data arriving from a plurality of devices coupled to said NIC modules through a signal backplane, wherein at least one of said NIC modules acts as a master timing NIC module responsible for allocating a first time interval for transmission of periodic data over said databus and for allocating bandwidth on said network databus, said method comprising the steps of:

transmitting all periodic data on said network databus during said first time interval;

transmitting requests for said master timing NIC module for transmission of aperiodic data;

processing said requests by dynamically assigning an aperiodic data transmission interval;

dynamically assigning variable transmission time intervals within the aperiodic data transmission interval, according to priority and availability of bandwidth on said network databus;

transmitting a status message to said plurality of NIC modules, said status message indicating what requests are assigned bandwidth on said network databus for transmission of aperiodic data and order of transmission;

transmitting said aperiodic data over said network databus according to said order of transmission;

transmitting the status message to each of said NIC modules; and storing indicators in said priority tables as to what requests were assigned bandwidth on said network databus for transmission of aperiodic data and order of transmission.

13. The method of claim 12, wherein said step of processing said requests includes the step of guaranteeing a certain amount of bandwidth to at least on of said requests.

* * * * *